(12) United States Patent
Granacher

(10) Patent No.: US 6,783,047 B2
(45) Date of Patent: Aug. 31, 2004

(54) EXPANDING GAS-OPERATED SETTING TOOL

(75) Inventor: Thomas Granacher, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/420,413

(22) Filed: Apr. 22, 2003

(65) Prior Publication Data

US 2003/0201297 A1 Oct. 30, 2003

(30) Foreign Application Priority Data

Apr. 24, 2002 (DE) .......................................... 102 18 194

(51) Int. Cl.⁷ .............................. B25C 1/04; B25C 1/10
(52) U.S. Cl. ............................. 227/10; 227/9; 227/130; 123/46 E; 123/46 H
(58) Field of Search .............................. 227/9, 10, 130; 123/465 C, 1 A, 46 R, 46 H, 46 E

(56) References Cited

U.S. PATENT DOCUMENTS

| | | | | |
|---|---|---|---|---|
| 5,794,831 A | * | 8/1998 | Velan et al. .................... 227/2 |
| 5,860,580 A | * | 1/1999 | Velan et al. .................. 227/10 |
| 5,897,043 A | * | 4/1999 | Veoukas et al. ............... 227/10 |
| 6,012,622 A | * | 1/2000 | Weinger et al. ................. 227/8 |
| 6,102,270 A | * | 8/2000 | Robinson ...................... 227/10 |
| 6,123,241 A | * | 9/2000 | Walter et al. ................... 227/8 |
| 6,145,724 A | * | 11/2000 | Shkolnikov et al. ............ 227/8 |
| 6,164,510 A | * | 12/2000 | Deieso et al. ................ 227/130 |
| 6,619,527 B1 | * | 9/2003 | Moeller ........................ 227/10 |

OTHER PUBLICATIONS

Wagdy, Fastener Tool Having Auxiliary Fuel Cell Metering Valve Stem Seal Adapter, Jul. 10, 2003, US 2003/0127488.*

* cited by examiner

Primary Examiner—Stephen F. Gerrity
Assistant Examiner—Gloria R Weeks
(74) Attorney, Agent, or Firm—Sidley Austin Brown & Wood, LLP

(57) ABSTRACT

An expanding gas-operated setting tool for driving fastening elements, such as nails, bolts, pins, etc., into a substrate, includes a housing (11), a setting mechanism (15), located in the housing (11) for driving the fastening element into a substrate, electrical consumers at the setting tool (10), the source of power comprising a fuel cell (31), which is mounted on the setting tool for supplying power to electronic components of the setting tool and which can be operated with fuel in a fuel reservoir (20, 30), which is mounted on the setting tool (10), and with oxygen.

8 Claims, 2 Drawing Sheets

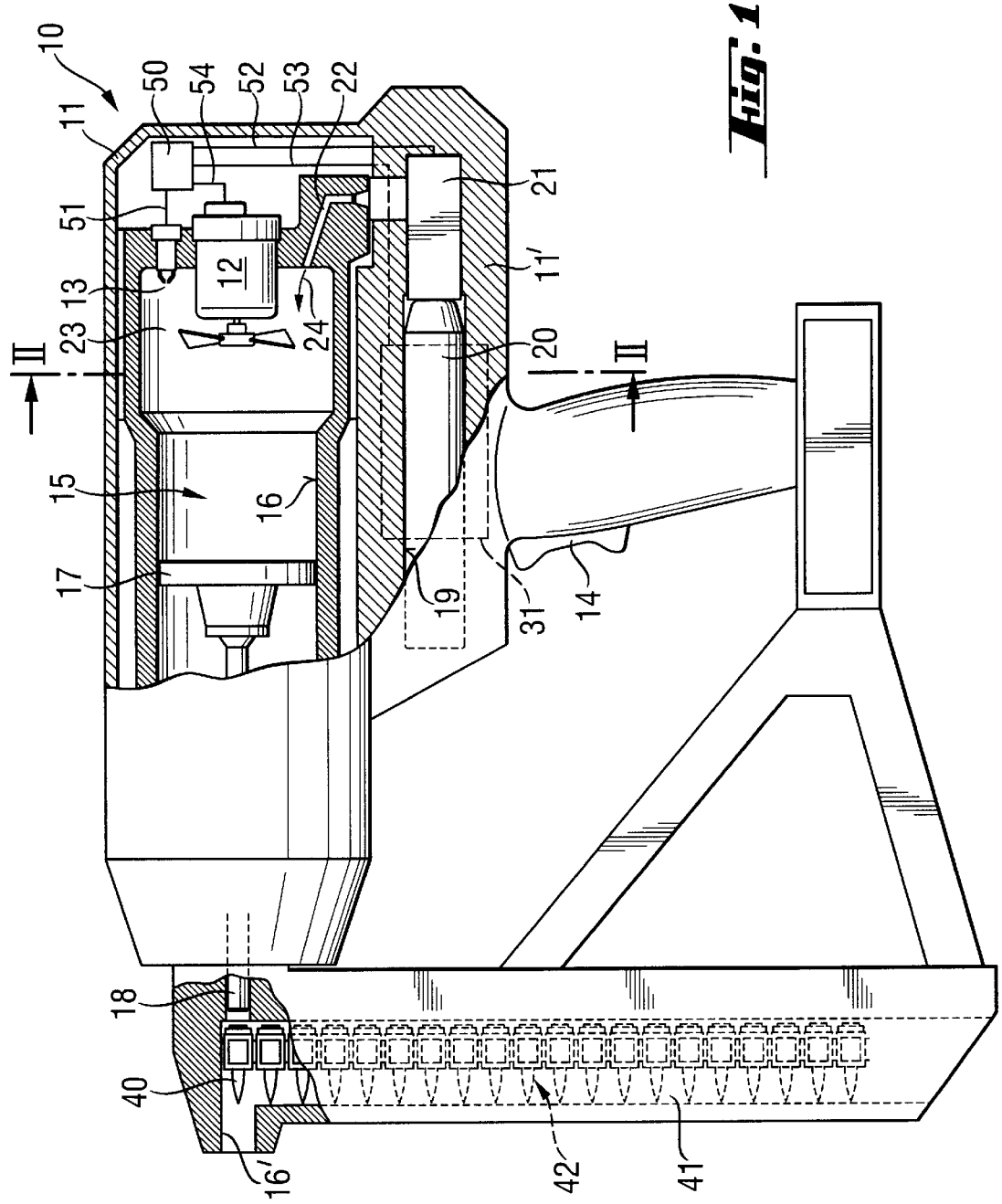

EXPANDING GAS-OPERATED SETTING TOOL

BACKGROUND OF THE INVENTION

1. Field of the Invention

The present invention relates to an expanding gas-operated setting tool for driving fastening elements, such as nails, bolts, pins and the like in a substrate and including a housing, a setting mechanism located in the housing, and a source of expanding gases, e.g., a fuel reservoir.

2. Description of the Prior Art

Setting tools of the type described above generally also includes electronic components, such as electronically controlled valves, ignition devices, ventilators, etc. These components and their control devices must be supplied with power, preferably not dependent on an electrical network or another centralized power system.

U.S. Pat. No. 4,403,722 discloses a gas-driven setting tool for which the mixture of air and fuel in the combustion space is homogenized before ignition by an electrically driven ventilator. A nickel-cadmium battery is provided there for supplying power to the ventilator driving mechanism and its control device.

The technologically limited capacity of the nickel-cadmium battery is a major disadvantage of this type of power supply.

Usable alternative batteries with better efficiencies (capacity/weight) cannot be employed in practice. A NiMH battery with, for example, a higher capacity at the same weight, cannot be used at temperatures below 0° C., since the voltage behavior of this battery is not stable at cold temperatures.

Furthermore, U.S. Pat. No. 6,123,241 discloses a gas-driven setting tool in which various electronic devices are controlled and/or monitored by an extensive electronic control system. Thus, there provided on the setting tool various sensors, such as temperature, pressure and working-surface temperature sensors as well as an electronic ignition and an electrically driven. Two sources of power are required to supply this setting tool. An alkaline battery supplies electrical energy to a microprocessor, which is the core of the control system, and a lead acid battery is the main battery. It is a disadvantage of this setting tool that, due to the high demand for electric energy, two batteries are used there to supply power. Consequently, the size and weight of the tool are larger.

It is, therefore, an object of the invention to provide a setting tool of the aforementioned type, which can be operated independently of its location and which avoids the aforementioned disadvantages.

SUMMARY OF THE INVENTION

This and other objects of the present invention, which will become apparent hereinafter, are achieved by using, as a power source, a fuel cell operable by fuel, stored in a fuel reservoir provided on the tool, and oxygen. Preferably, the reservoir can be refilled or, when empty, exchanged for a full reservoir. The oxygen can also be obtained from a reservoir provided on the setting tool or taken from the surrounding air.

By using a fuel cell in the setting tool, a very high efficiency of up to 60% which is independent of any mains supply, and a long operating time can be achieved advantageously with one filling of the fuel reservoir. Furthermore, the fuel cell, as a source of electric energy, enables to use the setting tool even at temperatures below 0° C. It is also possible to operate the setting tool for the same length of time as at higher temperatures. This is usually not the case with batteries.

When a setting tool is operated with liquid or gaseous fuels, advantageously, the fuel cell is coupled thermally to the fuel reservoir or the fuel can. The thermal coupling can be accomplished, for example, by arranging the fuel cell adjacent to the fuel reservoir, so that the latter is heated by the waste heat coming from the fuel cell. Dependent on the type of the fuel cell, the entropy or heat of reaction can be up to 90° C.

Due to this measure, the fuel can or reservoir, which is still cold at the start of the operation, can be heated rapidly and, when the ambient air is cold, so that interruptions in the supply of fuel to the tool can be avoided. In particular, the danger of vapor locks in setting tool, operated with liquefied gas, is reduced, and the ignition behavior above a pre-set operating temperature is improved.

Advantageously, the fuel cell and the fuel reservoir can be disposed jointly in a heat-conducting part of the setting tool. The fuel cell and the fuel reservoir can also be accommodated separately in the heat-conducting part. By such a measure, uniform heating of the fuel reservoir is achieved. The heat-conducting part may also be an integral component of the metal housing of the setting tool.

Advantageously, means for cooling the heat-conducting part, such as cooling ribs or housing ribs, over which the excess thermal energy, for example, when the fuel can is already heated, can be released into the surrounding air, may be provided at the heat-conducting part.

When a PEM fuel cell (polymer electrolyte membrane fuel cell) or a similar fuel cell is used, the advantages are, for example, the uncomplicated handling, the low weight and the high power density because of the good proton conductivity of the electrolyte.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS:

The drawings show:

FIG. 1 a side, partially cross-sectional view of a first embodiment of a setting tool according to the present invention;

DETAILED DESCRIPTION OF THE PREFERRED EMBODIMENTS

Figure 2:
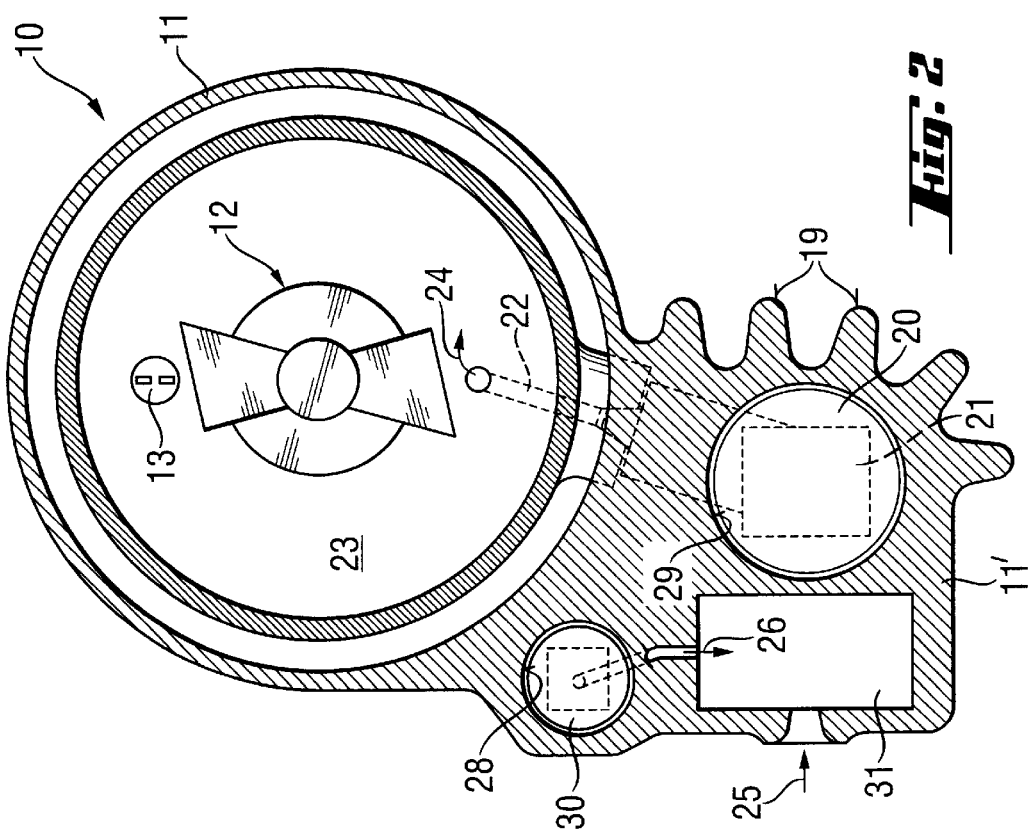
FIG. 2 a cross-sectional view along line II—II in FIG. 1.

A setting tool 10 according to the present invention which is shown in FIGS. 1–2, has a housing 11, in which the setting mechanism 15 is disposed, with which a fastening element 40 can be driven into a substrate, which is not shown here, when the setting tool 10 is pressed against the substrate.

The setting mechanism 15 comprises a combustion space or combustion chamber 23, a piston guide 16, in which a driving piston 17 is displaceably mounted, and a bolt guide 16', in which a fastening element 40 can be guided. The fastening element 40 can be moved by the forward-moving end 18 on the setting-direction side of the driving piston 17 and driven into a substrate.

In the present example, a ventilator 12 and an ignition device 13, such as a spark plug, are disposed in the combustion chamber 23. In a known manner, the ventilator 12 produces turbulence in the combustion chamber 23 for mixing the fuel gas with air, before a spark for igniting the fuel-air mixture is initiated by a control device 50 at the ignition device 13. Fuel is supplied from a reservoir 20 to the combustion space 23 over a fuel pipeline 22 and a valve 21, which can be triggered electronically or mechanically.

The setting process as such is initiated only after a switch 14 or a trigger in the handle of the setting tool 10 is actuated. This switch 14 can be a mechanical, electronic or electro-mechanical switch. Furthermore, additional switches, all, or different combinations of which, must be switched together in order to initiate a setting process, may be provided in the setting tool. These switches are, for example, Nasenkopf switches, magazine switches or sensors, which determine, for example, the nature of the substrate.

For the setting tool in question, electrical consumers of the setting tool 10, such as a control system 50, a ventilator 12, an ignition device 13, the switch 14 and, optionally, the further switches of the valve or valves 21 and other electronic components are supplied with power from a fuel cell 31, which is arranged in a heat-conducting part 11', which also contains the fuel reservoir 20 for operating the setting tool 10. If the tool is cold, the fuel reservoir 20, such as a gas can, can be heated rapidly and brought to the operating temperature by using the waste heat from the fuel cell 31. A vapor lock of the type, which frequently occurs with gas-driven setting tool, can, thus, be avoided. For cooling the fuel cell 31 and the setting tool 10, cooling ribs 19 or other means, which promote the exchange of heat with the surrounding air, can be provided in the heat-conducting component 11'.

The electrical energy from the fuel cell 31 is distributed to the consumers, and electrical control pulses are transferred over electrical supply and control leads 51, 52, 53, 54.

In order to be able the fuel reservoirs 20, 30 for the fuel gas of the setting tool and the fuel of the fuel cell 31, both fuel reservoirs 20, 30 are plugged into holding fixtures 28 and 29 in the heat-conducting part 11' of the setting tool 10, in which they are held by a detachable connection. When a fuel reservoir 20, 30 is empty, it can be exchanged easily and replaced by a full one. The fuel reservoirs can, however, also be constructed so that they can be filled directly in the setting tool 10.

For supplying fuel 26 to the fuel cell 31 in the present example, the second fuel reservoir 30 is provided, which is filled, for example, with hydrogen, methanol or a different fuel usable in the fuel cell. On the other hand, fuel is supplied via lead 24 to the combustion space 23 of the setting tool 10 from the fuel reservoir 20, which is filled with a suitable fuel, such as a fuel gas or fuel gas mixture. Air is supplied via lead 25 to the fuel cell 31 from the surrounding environment. It is, however, also conceivable to provide a separate oxygen tank at the setting tool, from which air or oxygen can then be supplied to the fuel cell 31.

The fuel cell 31 functions according to principles, generally known to those skilled in the art. For example, the use of a PEM fuel cell (polymer electrolyte membrane fuel cell) may be advantageous.

The fastening elements 40 are assembled in a magazine 41 into a magazine strip 42, which is disposed at the front of the setting tool. Alternatively, the fastening elements 40 may also be inserted individually by the user in the bolt guide 16'.

Figure 3:
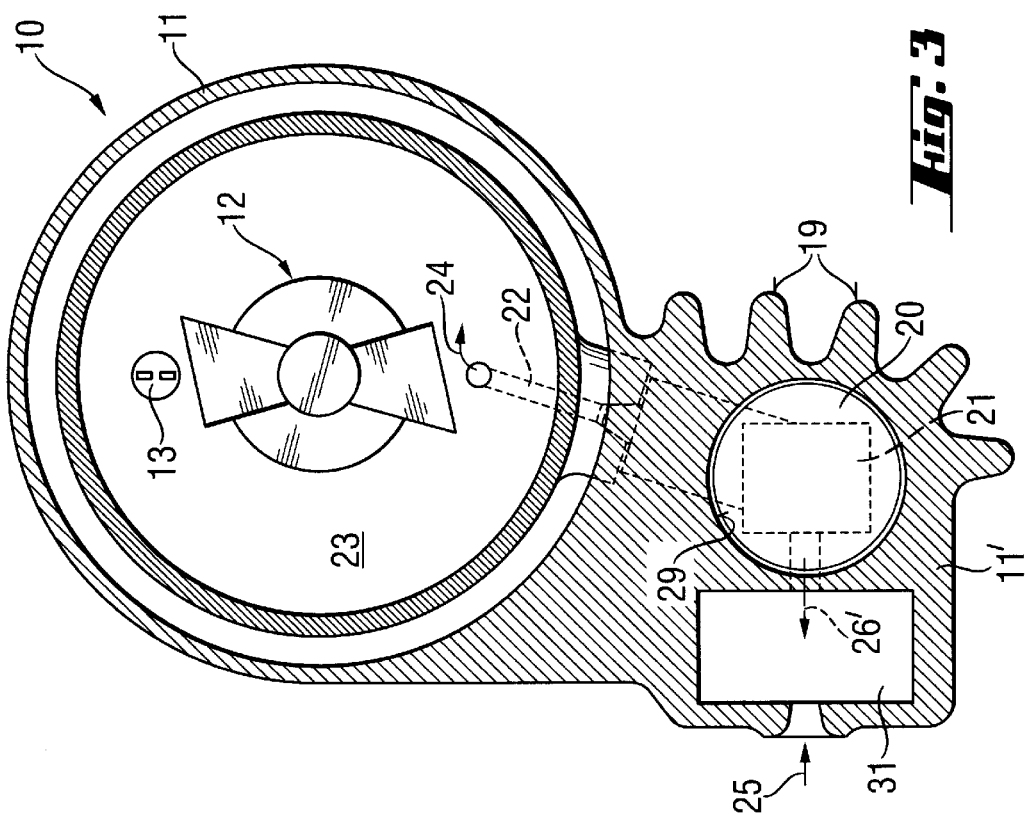
FIG. 3 a cross-sectional view similar to that of FIG. 2 of a second embodiment of a setting tool according to the present invention.

In FIG. 3, a second example of inventive setting tool 10 is shown, which differs from the previously described setting tool in that only one fuel reservoir 20 is provided there, which supplies fuel via lead 26' to the fuel cell 31 as well as supplies fuel via the lead 24 to the combustion chamber 23 of the setting tool 10. The fuel gas is selected so that it is suitable for the combustion process in the combustion chamber of the tool, as well as for use in the fuel cell 31. Examples of such a fuel are hydrogen, propane, butane, ethanol, and methanol.

The invention is not limited to the embodiments presented here. For example, the thermal coupling can also be accomplished over one or more heat conductors, which connect the reservoir 20 with the fuel cell 31. In particular, the fuel cell 31 and the reservoir 20 need not be disposed in one and the same component. Instead, they may be disposed spatially separated from one another in or on the setting tool 10.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. An expanding gas-operated setting tool for driving fastening elements in a substrate, comprising a housing (11); a setting mechanism (15) located in the housing for driving-in the fastening elements (40); a fuel cell (31) for supplying power to electronic components of the setting tool and which is one of arranged in the housing (11) and arranged on the housing (11) and is operable by a mixture of fuel and oxygen; and a fuel reservoir (20, 30) for supplying fuel to the fuel cell (31) and which is one of arranged in the housing (11) and arranged on the housing (11).

2. A setting tool according to claim 1, wherein the fuel is one of liquid fuel and gas fuel, wherein the fuel reservoir (20) also serves as source of fuel for operating the setting mechanism, and wherein the fuel cell (31) is thermally connected with the fuel reservoir (20) whereby the fuel reservoir (20) can be heated by the waste heat of the fuel cell (31).

3. A setting tool according to claim 2, wherein a same fuel is used for operating both the fuel cell (31) and the setting mechanism (15).

4. A setting tool according to claim 1, wherein the fuel cell (31) is a polymer electrolyte membrane fuel cell.

5. A setting tool according to claim 1, wherein the fuel contains at least one material from a group consisting of hydrogen, n-alkane, monohydric alcohols, and multihydric alcohols.

6. A setting too according to claim 1, further comprising a heat-conducting component (11') for mounting both the fuel cell (31) and the fuel reservoir (20, 30) in a thermal contact with each other.

7. A setting tool according to claim 6, wherein the heat-conducting component (11') is formed of steel and forms part of the housing (11').

8. An expanding gas-operated setting tool for driving fastening elements in a substrate, comprising a housing (11);

a setting mechanism (15) located in the housing for driving-in the fastening elements (40); a first fuel reservoir (20) for operating the setting mechanism (15); a fuel cell (31) for supplying power to electronic components of the setting tool and which is one of arranged in the housing (11) and arranged on the housing (11) and is operable by a mixture of fuel and oxygen; and a second fuel reservoir (30) for supplying fuel to the fuel cell (31) and which is one of arranged in the housing (11) and arranged on the housing (11).

\* \* \* \* \*